United States Patent [19]
Krzyminski

[11] Patent Number: 6,086,274
[45] Date of Patent: Jul. 11, 2000

[54] LINE PRINTER FOR THE DIGITAL OUTPUT AND COLORIMETRIC MEASUREMENT OF COLORED IMAGES

[76] Inventor: Ulrich Krzyminski, Wiesbadener Strasse 27, D-61462 Königstein, Germany

[21] Appl. No.: 09/003,839

[22] Filed: Jan. 7, 1998

[30]    Foreign Application Priority Data

May 27, 1997 [DE] Germany ................. 197 22 073

[51] Int. Cl.[7] .................................................. B41J 29/18
[52] U.S. Cl. .............................. 400/703; 400/711; 347/19
[58] Field of Search ............................. 400/703, 711, 400/175; 347/2, 19, 232; 358/198, 501, 502, 504, 518, 519, 500, 523, 515, 525, 520; 395/104

[56]    References Cited

U.S. PATENT DOCUMENTS

| | | | |
|---|---|---|---|
| 5,748,221 | 5/1998 | Castelli et al. | 347/232 |
| 5,781,206 | 7/1998 | Edge | 347/19 |
| 5,841,955 | 11/1998 | Wang | 395/109 |
| 5,877,787 | 3/1999 | Edge | 347/19 |

*Primary Examiner*—Christopher A. Bennett
*Attorney, Agent, or Firm*—Webb Ziesenheim Logsdon Orkin & Hanson, P.C.

[57]    ABSTRACT

The present invention is concerned with a line printer for the digital output and calorimetric measuring of colored images, comprising a housing, a paper feeder, a paper discharge means, a printer carriage movable in a direction transverse to the paper feed plus printing head and flexible printer cable, a transporting roller for the paper feed and a printer controller for the control of the printing functions. To enable a line printer of the afore-described type to be used not only for its inherent printing function but also for colorimetric measurements and for computing and using the color profile, to thereby automate the color characterizing process and to free the user from using manual and error-susceptible designs containing a color measuring instrument of the conventional type, in the practice of the invention, a color measuring head for reflection measurements is arranged to be fixed to the printer carriage in lieu of or in addition to the printing head, with the said color measuring head with the measuring aperture thereof being oriented toward the paper passage plane and being in communication with its amplifying, control and evaluating electronic units arranged internally or externally of the printer.

17 Claims, 5 Drawing Sheets

6,086,274

1

LINE PRINTER FOR THE DIGITAL OUTPUT AND COLORIMETRIC MEASUREMENT OF COLORED IMAGES

BACKGROUND OF THE INVENTION

1. Field of the Invention

The present invention relates to a line printer for the digital output and colorimetric measurement of colored images.

2. Description of Prior Art

Color printers and line printers, respectively, are widely used in the form of digital output devices forming part of a computer system for processing colored images. Computer systems of this type are used, in particular, also in the DTP area (Desk Top Publishing area) for designing pictures and printed pages that, subsequently, are multiplied in large numbers on a printing press. DTP systems of this type comprise a computer having a color screen, a scanner for the digitalized input of the data of the images to be processed in the computer, a film exposing means for the output of films for subsequently copying the same on printing plates, and a digital color output device. The color output device provides a print-out of the images processed by the DTP system, or of printed pages, with the colors of the digital print-out corresponding to the original picture or to the desired result on the printing press. Digital color output devices generate, as a rule, the printable color volume by over-printing or side-by-side printing of several process colors (usually cyan, magenta, yellow and black). The color output device is provided by the computer with digital control data providing information on the ratio at which the individual process color channels of the printing head are to be actuated. There is no generally applicable relationship between the said control data and the color actually generated on the output medium, because the properties of the material to be printed and the process colors, as well as parameters such as ambient temperature and humidity, will determine the actually resultant color. Different output devices, processes and media, with identical control data, result in different color output. The underlying object, therefore, resides in identifying the color characteristics of the output device. A mathematical relationship is established between the color control data and the colors actually generated in the output process. This process is designated by color characterization or color profiling. The result is a so-called color profile.

Presently, the color characterization is in three steps. During the first step, a so-called color test chart is provided by the color output device. The said test chart comprises a number of color fields. Each individual color field is generated by defined color control data. The color control data for the fields is so selected as to cover the maximum color gamut of the output device. The color control data representing the test chart are sent by a computer to the color output device.

During the second step, each individual field of the test chart is subjected to a calorimetric measurement by a color measuring device which forms hand-held measuring instrument manually positioned above each individual color field, or XY-coordinate measuring tables on which the test chart is positioned, with a motor driven measuring instrument operating to expose color field by color field to calorimetric measurements, with the resultant data being transmitted to a computer.

During the third step, the calorimetric data, by a color profiling software, is mathematically related to the color control data to compute a color profile. Specific color discrepancies of an output device can thus be compensated by employing a specific color profile.

The test charts used for color characterization purposes comprise a large number of differently colored measuring fields. To insure complete characterization of the entire color volume, the test charts contain between 400 and 2000 color fields. For example, the standardized test chart ANSI IT 8.7/3- 1993 has 928 color fields sized 6×6 mm. Measuring the large number of color fields in succession with the aid of a hand-held measuring instrument would be time-consuming and troublesome even if the measured values after each individual measurement were automatically transmitted, via a data cable, by the measuring instrument to the computer computing the color profile after completion of the measurements. Moreover, the monotonous repetition of the measuring operation would easily result in operating errors. The evaluation on a coordinate measuring instrument would require additional working space and would be complex to perform with especially high technical efforts involved.

SUMMARY OF THE INVENTION

It is the primary object of the invention to avoid the afore-described complex and troublesome operations and to so modify a line printer of the afore-mentioned type that the said device is able to perform in addition to its inherent printing function, calorimetric measurements and, optionally, also compute and apply the color profile to thereby automate the color profiling process so that there will be no need for the user to perform manual and error-susceptible operations with the aid of a conventional color-measuring instrument.

This problem, in the practice of the invention, is solved by a line printer of the afore-mentioned type in that a color measuring head for reflection measurements in lieu of or in addition to the printing head is rigidly mounted on the printer carriage, with the measuring aperture of the said color measuring head being oriented toward the paper passage plane and with the said color measuring head being connected to its amplifying, controlling and evaluating electronic units arranged internally or externally of the printer.

In accordance with the invention, the measuring head of a color measuring instrument is thus integrated in the printer, which measuring head will automatically scan, line by line the color fields of the previously printed test chart; the printing mechanism anyway installed is utilized for the continuous scanning operation. In addition, the flexible data cable is used for supplying power to the measuring head and for transporting the measured values, with the said cable following the movement of the measuring head, providing the same with electricity and the required control signals. The measuring head is installed either in side-by-side relationship with the printing head or in exchange thereof in which case it is mounted in the support thereof. The measuring head can be furnished with part of the required evaluating electronic unit, with that part of the electronic unit being preferred which amplifies and, optionally, digitalizes the analog measuring signals directly on the measuring head to achieve a noise-free data transport via the flexible data cable. For occasionally calibrating the measuring head, a ceramic white standard is arranged in the area of the resting position of the printing head and the measuring head on one end of the guiding path.

Moreover, the digital output device can be furnished with a computing unit of its own that is installed in the device, with the said computing system performing a variety of functions for printing and measuring the test chart and for the color characterization of the printer independently of the computer of the DTP system. Individually, such functions are the control operation for printing one or several test charts with the color control reference data stored in the computing system, the control operation for measuring the test chart, the evaluation of the measured data and the calculation of the color profile and, finally, the storage of one or several color profiles and the automatic correction of the control data for the actual printing process in accordance with one of the computed and stored color profiles. The computing unit installed in the output device may be an independent unit provided only for the functions as described or can be an extended printer processor frequently contained in output devices for professional applications. In either case the output device is largely independent of the DTP computer thereby causing connection and operation to be facilitated and safer and the DTP computer to be relieved from additional computing and control functions.

BRIEF DESCRIPTION OF THE DRAWINGS

The above and other features, objects and advantages of this invention will become apparent from the following detailed description of preferred embodiments, taken in conjunction with the accompanying drawings, wherein.

DETAILED DESCRIPTION OF PREFERRED EMBODIMENTS

Figure 1:
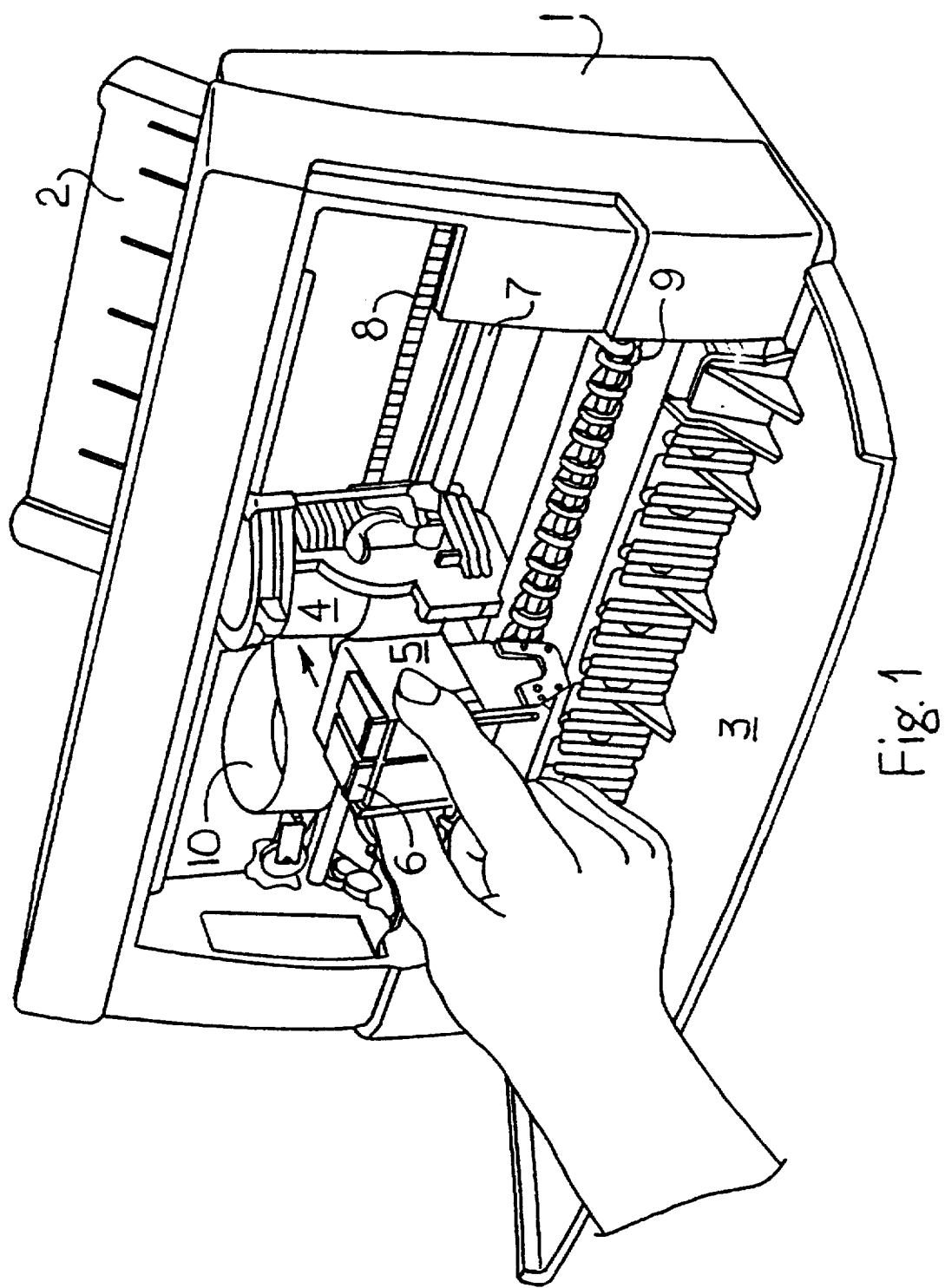
FIG. 1 is a perspective view of the standard design of a line printer.

The line printer shown in FIG. 1 is described hereinafter only for completeness' sake as it is known per se; it comprises housing 1 including the paper supply means 2 and the output means 3 for the printed sheets. The paper supply means 2 is able to pick up several sheets, feeding them to a single-sheet take-up unit (not shown) of the actual printing mechanism. The printing mechanism comprises the printing carriage 4 including the replaceable printing head 5 in which are seated cartridges 6 for the printing inks transmitted in the widely used ink jet printers in the form of small droplets to the paper resulting in a dotted image design according to the principle of the subtractive ink mixture. The ink droplets are generated either by heat or by piezo crystals through digitalized current pulses controlled according to the image data stored in the computer or in the printer processor. The printer carriage 4 with the printing head 5 is reciprocated on a guiding rail 7, with the drive being preferably effected by a toothed belt 8 guided via rollers. In each reciprocating movement of the printing head, a number of dots is printed and the sheet to be printed is transported through the transporting roller 9 a small distance toward the output device 3. Designated by numeral 10 in FIG. 1 is the flexible printer cable formed as a flat band cable and carrying several copper conduits while electrically establishing the movable connection between the printer unit and the control unit (not shown) of the digital color output device. Thanks to the transporting mechanism comprising the printer carriage 4, the guiding rail 7, the toothed belt drive 8, the transporting roller 9 and the flexible data cable 10, all elements are provided that are required for an "in-line measurement" by an exchangeable measuring head 11 or a measuring head secured next to the printing head 5 on the printer carriage 4.

Figure 2:
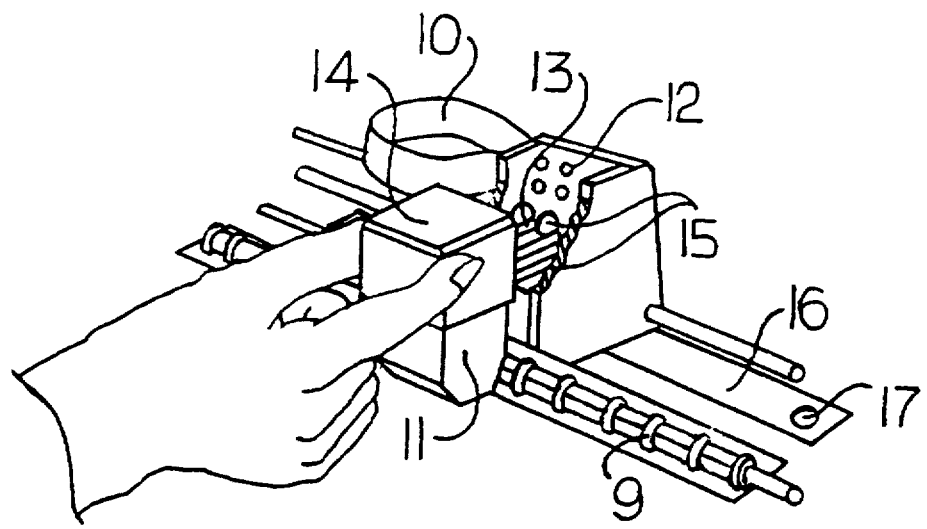
FIG. 2 is a perspective view of the principle of the exchangeable measuring head.

FIG. 2 shows the principle of a measuring head 11 exchangeable for the printing head 5. Contact sleeves 12 on the side of the printer carriage 4 and contact pins 13 on the side of the measuring head, through the flexible flat band cable 10, electrically establish a connection between the printer controller 35', the control and evaluating electronic unit and the measuring head 11. The control and evaluation electronic system is the part of the color measuring instrument that is rigidly installed in the printer which with the aid of a processor of its own processes the measured signals to result in digital color data, transmitting the same in a predetermined data format to the computing unit in the printer or to the DTP computer yet to be explained hereinafter in greater detail. Designated by numeral 14 is the schematically shown portion of the measuring electronic unit which reciprocates along with the measuring head 11 and which, primarily, acts to amplify the measuring signals directly at the location of their generation. To insure that the measuring head 11 is firmly seated within the printer carriage 4, sleeves and locking pins 15 (see FIG. 3A) or a similar easily detachable mechanical connection are provided. Designated by numeral 17 is a white standard (see FIG. 2) for occasionally calibrating the color measuring instrument, which is positioned within the range of the resting position. It is preferably made of ceramics having a smooth and pore-free surface which is easy to clean and, advantageously, is secured to the guiding plate 16 guiding the sheet of paper to the transporting roller 9.

During printing the paper sheet is guided by the paper supply unit 2 toward the output device 3. To be subsequently measured on the printed test chart, the sheet can be withdrawn from the output device 3 to be guided again through the printer via the supply unit 2. However, the paper transport also can be so programmed that after printing of the test chart the sheet is automatically transported back to be automatically guided, for measuring purposes, again through the printer. Moreover, provision can be made that measurements can already be made when transporting back the printed sheet.

The afore-described embodiment according to which printing head 5 and measuring head 11 can be exchanged for one another, is a particularly low-cost solution; however, it involves the disadvantage that the exchange is to be done by the user. Advantageously, although slightly more costly, the printer carriage is provided with two accommodating units so that printing head and measuring head can be left in side-by-side relationship within the printer. However, in that case it will be necessary to arrange besides the two accommodating units additional conduits within the flexible flat band cable and to expand the printer at least by the width of the measuring head in order to maintain the printable and measurable format. It is also in that solution that provision is to be made that printing head and measuring head are rapidly exchangeable with ease for cleaning the measuring head and for replacing the ink cartridges.

Arranging printing head 5 and measuring head 11 jointly will allow for a programming process according to which the printing and measuring functions are performed in one run of the test chart. The simultaneous printing and measuring operations offset by a small time interval only, is especially advantageous if the color measurement is not effected on a test chart but rather during the output of images. Measurements of this type performed directly in the image are of interest if a predetermined color is required to be maintained at predetermined portions of the image. With the aid of image data controlling the printing operation, the DTP-computer or the printer controller 35' also can transmit control commands for the performance of measurements if in image processing the image portions are previously determined on the DTP computer. If, in addition, the color code desired for the image location and the permitted tolerance are established during image processing, the printing process can be controlled to the effect that an acoustic or optical signal indicates that the tolerances are exceeded or that an indication of the measured value deviation is shown on the screen of the DTP system or a special display appears on the printer. In lieu of such an indication of the measured value deviation, provision can also be made that following the output of the images, the printer automatically prints a measurement protocol containing the measured points, nominal values, tolerances, actual values and deviations. Virtually, the simultaneous measurement within the image permits a repetition of the output with corrected control data, with the correction in the DTP computer or in the printer processor being effected on the basis of the previously measured color deviation. If a correspondingly large number of nominal values is specified, the output of images can be controlled across the complete image volume.

Another capability of control for the true-to-color print of images can be effected by using the image data anyway filed in the DTP computer or in the printer controller 35' as L*a*b* values or XYZ values (The L*a*b* CIELAB data values as well as the XYZ tristimulus data are internationally standardized and generally known color data enabling a color to be clearly determined with three numerical values), thereby achieving an almost complete color correction throughout the image.

Figure 3:
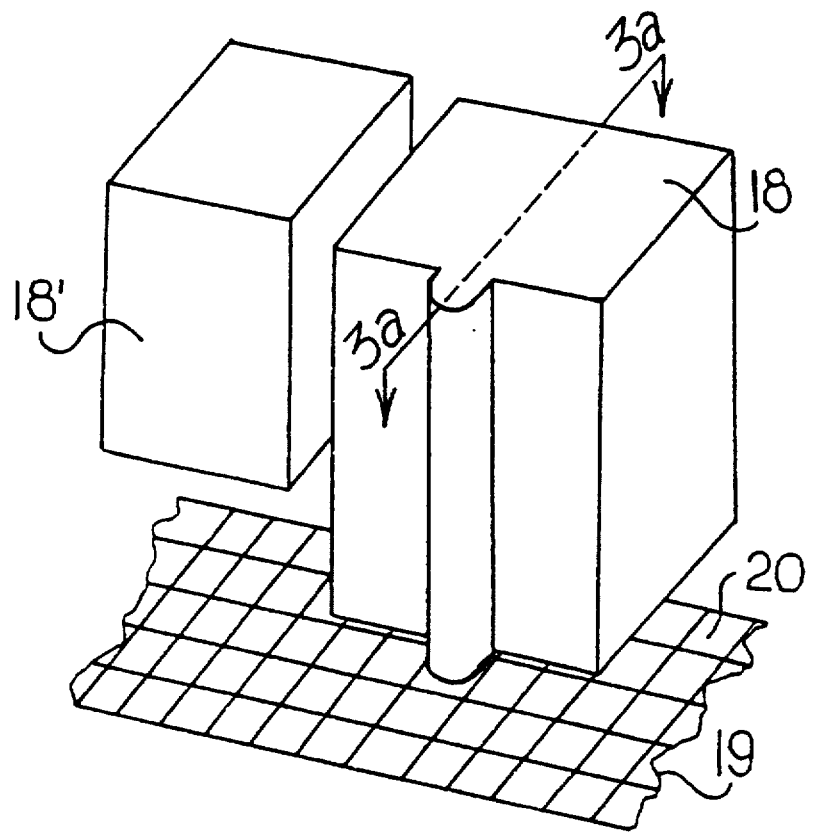
FIG. 3 is a perspective view of a measuring instrument for the "in-line measurement" according to the tristimulus method.

As the printing and measuring functions, in the afore-described instance, are effected at short intervals, it may be necessary to carry out, for wet-printing inks, a drying function between printing and measuring. Drying, advantageously, is effected with the aid of a device arranged on the printer carriage 4 between printing head 5 and measuring head 11 as schematically shown in FIG. 3 and as designated by reference numeral 18'. A drying device 18' of the afore-described type, depending on the chemical composition of the ink, can be an infrared light source, an UV-light source or a heater coil.

Two alternative processes are available for color measuring: the tristimulus method and the spectral method; both of them have been described, among others, in German Standard DIN 5033 and in other national and international standards.

FIG. 3 shows a measuring head for the tristimulus process particularly suitable for in-line measurements, of the type similar to the one described in German Patent 43 05 968. At the top of the perspective view, measuring head 18 is outlined above cut 19 of the printed test chart with color fields 20.

To the left, next to the measuring head, is shown the afore-mentioned drying mechanism designated by reference numeral 18'. Additional details of the measuring head 18 are shown by the sectional view according to FIG. 3A taken along the line 3a–3a of FIG. 3. The test chart 21 is vertically illuminated by the measuring light lamp 22 and the measuring light lens 23 arranged upstream thereof. The collection of the light reflected by the test chart is at 45°, thereby giving rise to the standardized 0°/45° measuring geometry. The reflected light is supplied to three photodiodes 24 (schematically shown in FIG. 4) provided with lenses mounted upstream thereof and to tristimulus filters 25. In view of the spatial arrangement thereof (respectively staggered by 120°) FIG. 3 shows only 2 photodiodes 24. The diode currents obtained as measuring signals are supplied to the amplifying electronic unit 26 provided with amplifiers 27. The additional electrically established connection to the flat band cable 10 is through contact pins 13; as mentioned before, corresponding sleeves 12 are provided herefore in the printer carriage 4. Forced into the body 28 of the measuring head are at least two locking pins 15 in respect of which corresponding sleeves are provided in the housing of the printer carriage 4 for mechanically fixing the measuring head. The dust-proof closure of the measuring head insured by the thin glass plate 29 provided on the bottom side of the measuring head dereflected on both sides, is of a special importance. It prevents the ingress of paper dust and the like contamination into the measuring head, likely to cause straylight. With the measuring head removed, the glass plate is easily cleaned. A slide element 30 of a cambered configuration made of a sliceable plastic material insures a constant space between measuring head and test chart so that no space changes will influence the measurement. Finally, a cover 31 screwed to the body 28 of the measuring head protects the amplifying electronic unit 26 and the photodiodes 24 against contamination.

Figure 4:
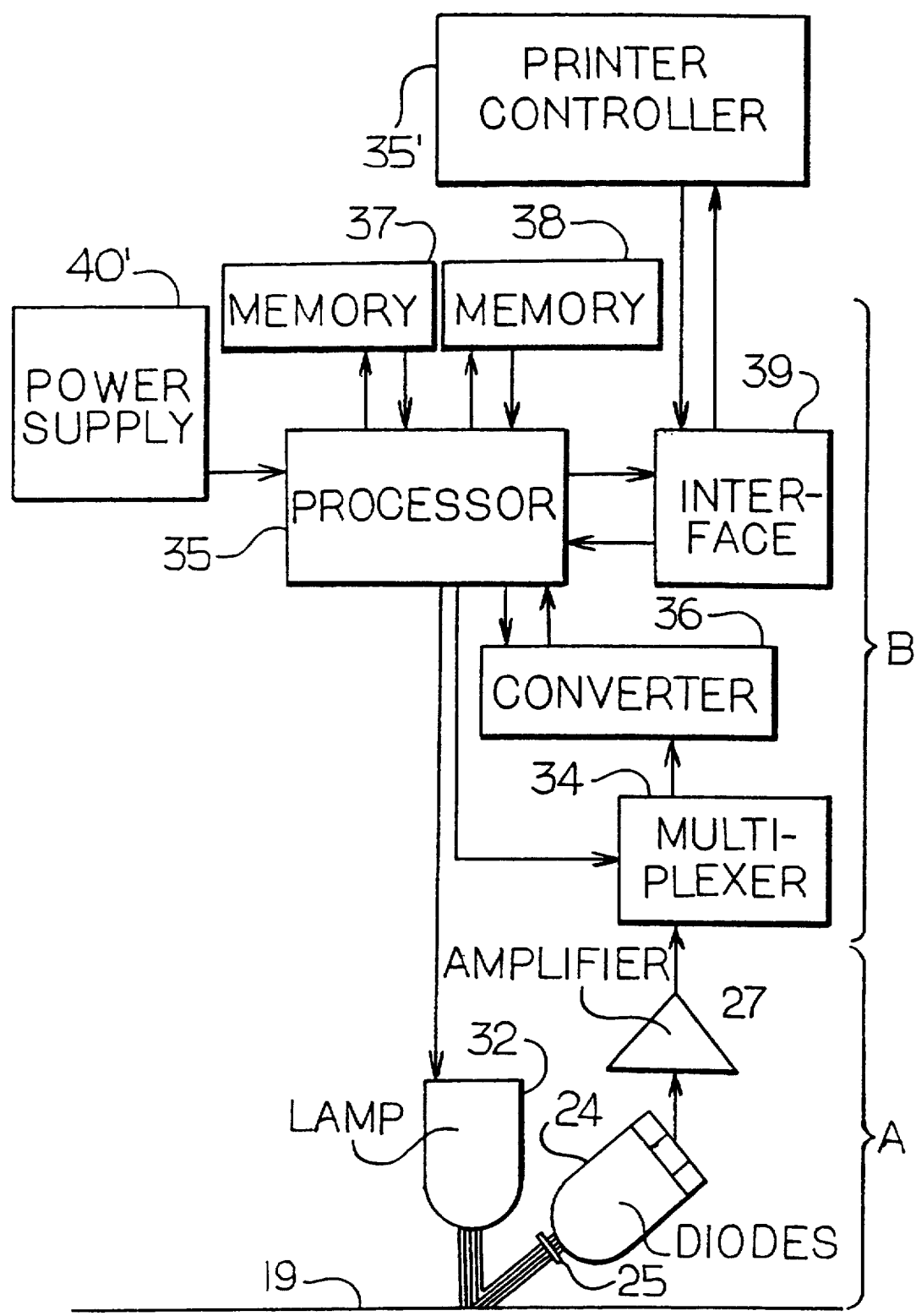
FIG. 4 is a block diagram of the complete color measuring instrument in accordance with the tristimulus method of FIGS. 3, 3A.

FIG. 4 shows a block diagram of the complete in-line color measuring instrument, subdivided into the movable part A of the measuring head and part B, representing the control evaluating electronic unit. The two parts are interconnected by the flexible flat band cable 10. The light of lamp 32 is directed toward the test chart 19. The analog measuring signals of the three photodiodes 24 with the three tristimulus filters 25 arranged upstream will be supplied to the three amplifiers 27. The amplified measuring signals are passed to the stationary control and evaluating electronic system in part B where they first reach the multiplexer 34 actuating the measured signals of the three diodes 24 at a high frequency in succession, clocked by processor 35. The clocked analog signals will be converted in the analog digital converter 36 into digital signals, with the said converter being equally controlled by processor 35; the digital signals are passed to the processor for further evaluation. The memory 37 contains the program for the whole in-line measuring process. The program, initially, controls the print-out of the test chart and then the complete measuring routine. Memory 38 after evaluation through the processor 35 will pick up the measured values. These values, preferably, are the L*a*b* values or the XYZ values. Both memories communicate bi-directionally with the processor 35 which upon request of the printer processor or the processor of the DTP computer will transmit the L*a*b* or XYZ values for computing the color profile via the bi-directional interface 39 to one of the afore-mentioned processors. For the sake of completeness, numeral 40' in FIG. 4 refers to the power supply for the whole of the "in-line measuring system" which, however, could also be safeguarded by the voltage supply of the printer provided anyway.

Figure 5A:
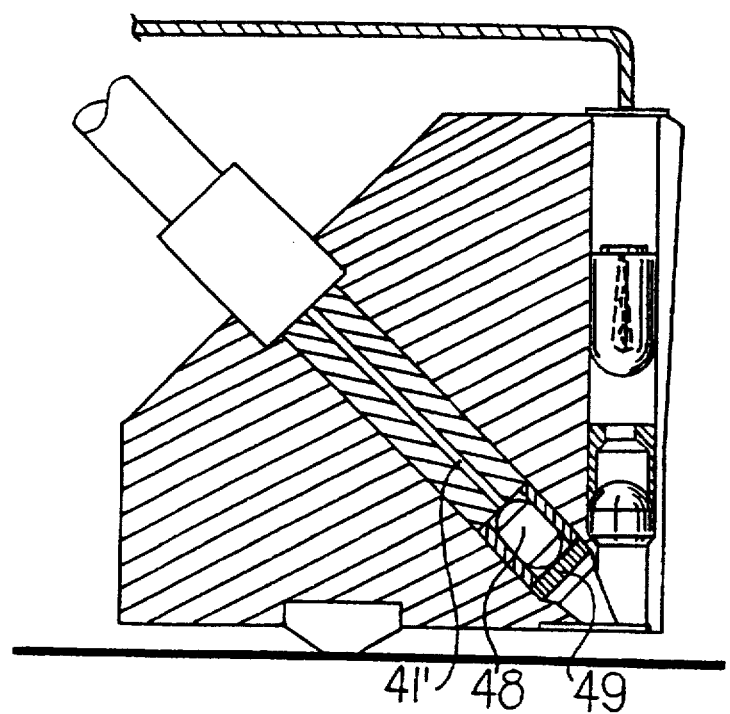
FIG. 5A is a sectional view of the measuring head of the measuring instrument according to FIG. 5.
Figure 5:
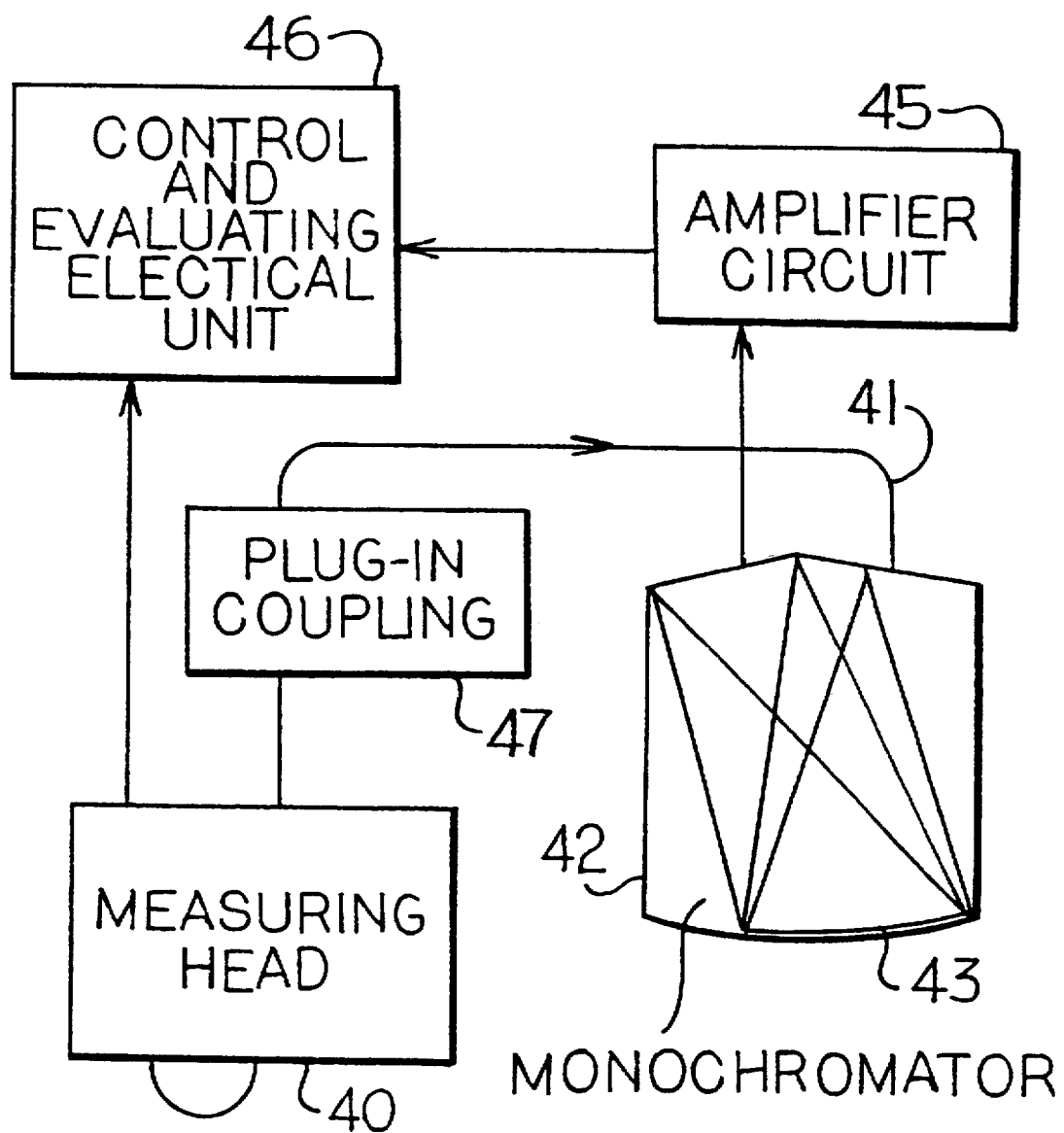
FIG. 5 is a block diagram for the spectral "in-line measuring system"

FIG. 5 shows the spectral "in-line measuring system". Spectral color measuring instruments subdivide the visible spectrum into individual band widths, the intensity of which is measured by photoelements and is evaluated in the form of a spectral reflection curve. Computed from the reflection curve are the L*a*b* values, the XYZ values and all other colorimetric values. The subdivision of the spectrum into band widths can be effected by a plurality of narrow band filters or by optical gratings. Modern devices almost exclusively employ gratings projecting the decomposed light to a diode array. FIG. 5 shows the essential components of a spectral color measuring instrument of this type in the form of a block diagram, while FIG. 5A is a sectional view of the measuring head 40 according to FIG. 5. The block diagram is of a special interest because it shows that the components permit different arrangements within the line printer. The reflected measuring light is fed via the light conductor 41 to the grating-diode module 42. The spectral decomposition of the measuring light focused on the diode array 44 is effected on the holographic grating 43. Diode arrays having 256 joined-together diodes are commonly employed, thereby achieving a high resolution of the spectrum not attainable by filter means. The signals of the diode array 44 are supplied to the amplifier circuit 45 and then to the control and evaluating electronic unit 46 which, according to FIG. 4, substantially is composed of processor 35, multiplexer 34 and AD converter 36, memory 37, interface 39 and power supply 40'. The printed circuit board including the amplifier circuit 45, basically, is mounted on the outputs of the diode array 44 to thereby avoid interferences with the non-amplified signals. The grating-diode module 42 and the amplifier circuit 45, hence, always form a unit. The control and evaluating electronic unit 45, advantageously, is rigidly installed in the printer. There are two options for arranging measuring head and grating-diode module on the movable printer carriage 4: for example, the measuring head 40 can be arranged jointly with the grating-diode module 42 and the amplifier circuit 45 on the printer carriage 4. In that case, the flexible data cable 10 will be adequate for establishing a connection with the control and evaluating electronic unit. Moreover, it will be possible to secure only the measuring head 40 to the printer carriage 4 and to stationarily accommodate within the printer the grating-diode module 42 along with the amplifier circuit 45 jointly with the control and evaluating electronic unit. In that instance, the light conductor 41 must be movably arranged in order to be able to follow along with the flexible flat band cable 10 the movement of the printer carriage 4. This will, technically, be possible because the light conductor is thin and flexible and, in addition, is made up of a plurality of thin optical fibers which, for example, can also be arranged as a flexible band in a manner corresponding to the copper conduit in the flexible flat band cable 10. The arrangement of the measuring head 40 separate from the grating-diode module 42 does, however, require a plug-in coupling 47 for the light conductor 41 arranged directly on the measuring head 40 in order that the same remains exchangeable. The most favorable way of arrangement of measuring head and grating-diode module will be dependent on the design of the line printer. For small-format printers the separate arrangement will be preferred whereas for large-format printers, it may be advantageous to house the measuring head and the grating-diode module jointly because the printer carriage will have to cover more extended distances inevitably resulting in a higher strain on the flexible light conductor.

The transmission of the reflected light via a flexible light conductor 41, due to the variable curvature of the light conductor during movement of the printer carriage 4, is likely to result in that the transmission will not remain constant but is exposed to slight fluctuations. Fluctuations of this type are known and will also occur once the curvature of the light conductor does not exceed the critical level, thereby influencing the total reflection of the light in the light conductor. The fluctuations can be compensated in that a constant measuring light is generated in the measuring head 40, reciprocating the same with the printer carriage across the full printing width. The resultant fluctuations of the signals caused by the grating-diode module 42 will be recorded by the control and evaluating electronic unit 46 in response to the distance covered, and will be filed in a special memory. Also it is advisable to evaluate the fluctuations both for forward and for the return movement. The stored fluctuations can be used with the aid of a correction program by the processor of the control and evaluating electronic unit for adjusting the subsequent measured values. The constant measuring light required for the test run, in a simple way, is generated in that the measuring head is guided over a non-printed sheet. The process of adjustment described herein-before does, of course, require that the light conductor 41 during movement of the printer carriage 4 always performs identical curves which is achieved by a suitable arrangement of the light conductor in the printer.

Figure 3A:
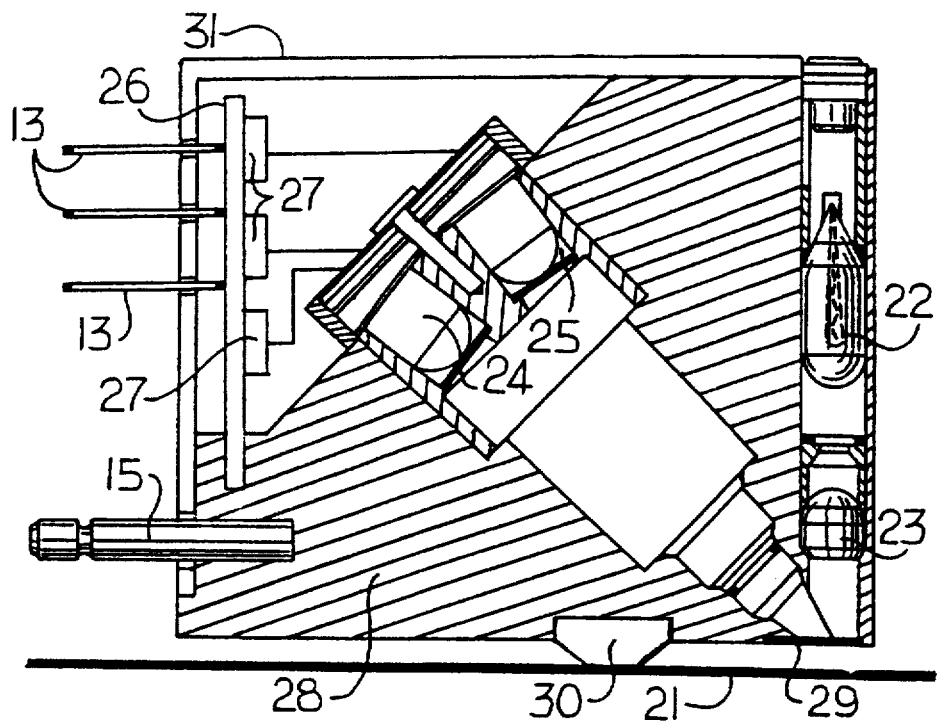
FIG. 3A is a sectional view of the measuring instrument according to FIG. 3.

The measuring head 40 of the spectral measuring instrument is, as shown by the sectional view according to FIG. 5A, of a similar design as the measuring head of the tristimulus device according to FIG. 3A. However, the collection of the reflected measuring light in that instance is effected through light conductor 41' on which are mounted an optical system in the form of a lens system 48 and an infrared absorbing filter 49.

What is claimed is:

1. A color measuring system having a line printer for the digital output and colorimetric measurements of colored images, comprising:

a housing;

a paper feed means for feeding paper to the line printer;

a paper discharge means for receiving paper from the line printer;

a printer carriage with a printing head and a flexible cable, wherein the printer carriage is movable in a direction transverse to the paper feed means;

a transporting roller for the paper feed means;

a printer controller for controlling the line printer; and a color measuring head with a light source and a measuring aperture oriented toward a measuring surface, the color measuring head arranged to be fixed to the printer carriage in lieu of or in addition to the printing head, wherein the color measuring head measures reflection from the light source off paper passing over the measuring surface and is in communication with its amplifying, control and evaluating electronic units arranged inside or outside the line printer.

2. The line printer of claim 1, wherein the amplifying electronic unit is arranged on the color measuring head.

3. The line printer of claim 1, wherein the color measuring head is fixed to the printer carriage by a mechanical locking means.

4. The line printer of claim 1, wherein contact pins on the color measuring head and the printer carriage are connected by the flexible printer cable to establish electrical connection between the printer controller, the control and evaluating electronic units, and the color measuring head.

5. The line printer of claim 1, wherein a ceramic white standard for calibrating the color measuring system is arranged in the printer at one end of a guiding rail of the printer carriage.

6. The line printer of claim 1, wherein the color measuring head on its bottom side facing the measuring surface is closed by a dereflected glass plate.

7. The line printer of claim 1, wherein the color measuring head on its bottom side facing the measuring surface is provided with a cambered spacer.

8. The line printer of claim 1, wherein the color measuring head is arranged next to the printing head and a drying unit is arranged between the color measuring head and the printing head.

9. The line printer of claim 1, wherein the light source of the color measuring head is a measuring light lamp and the color measuring head further includes a lens arranged such that light from the measuring light lamp passes therethrough, three photoelements with lenses and tristimulus filters arranged such that reflected light passes through the photoelements to the lenses to the tristimulus filters, and an amplifier electronic unit having three amplifiers.

10. The line printer of claim 1, wherein the color measuring head includes a flexible light conductor having a lens arranged at one end and a plug-in connector arranged at the other end for connection to the printer carriage at one end of the flexible light conductor and a spectral grating-diode module at the other end of the flexible light conductor.

11. The line printer of claim 10, wherein the spectral grating-diode module has a holographic, focusing grating, a diode array with pins and an amplifier unit, and the color measuring head has electrical contact pins and a mechanical locking means for securing the color measuring head to the printer carriage, wherein the spectral grating-diode module, in close association, is provided at a light entrance of the color measuring head with the light conductor fanned up to form a slit aperture and the holographic, focusing grating, the diode array and the amplifier unit directly connected to the pins of the diode array, and the spectral grating-diode module and the color measuring head are electrically connected and secured to the printer carriage by the electrical contact pins and the mechanical locking means.

12. The line printer of claim 10, wherein the spectral grating-diode module, through the flexible light conductor secured to the printing head or a flexible light conductor band, is in communication with the movable measuring head and is rigidly arranged within the line printer.

13. The line printer of claim 1, wherein the color measuring system includes a control and evaluating electronic unit rigidly arranged in the printer and having a processor, multiplexer, analog digital converter, program memory, measured value memory with a bi-directional interface for connection to the printer controller and to the computer of the DTP system, and a flexible printer cable forming an electrical connection to the printer head and to the measuring head.

14. The line printer of claim 13, wherein the control and evaluating electronic unit includes a program and a memory for adjusting light losses in the moved, flexible light conductor or light conductor band.

15. The line printer of claim 1, wherein the control and evaluating electronic unit of the measuring system or of the printer controller contains a program for computing and a memory for storing of color profiles and image corrections.

16. The line printer of claim 1, wherein the printer controller contains additional means for the control and evaluating functions for the color measuring system and, in addition to the programs for printing and measuring, several DTP programs for fonts, page set-up and other DTP functions and a raster image processor (RIP).

17. The line printer of claim 1, wherein the control and evaluating electronic unit includes a program for control commands and the paper feed roller includes a drive reversible in the direction of rotation for the automatic return of the printed test chart to the paper feeder.

* * * * *

UNITED STATES PATENT AND TRADEMARK OFFICE
CERTIFICATE OF CORRECTION

PATENT NO. : 6,086,274
DATED : July 11, 2000
INVENTOR(S) : Ulrich Krzyminski

It is certified that error appears in the above-identified patent and that said Letters Patent is hereby corrected as shown below:

In the Figures, delete Sheet 5 of 5, showing Fig. 4, and insert the attached Sheet 5 of 5, showing Fig. 5.

Signed and Sealed this

Twenty-second Day of May, 2001

Attest:

NICHOLAS P. GODICI

Attesting Officer     Acting Director of the United States Patent and Trademark Office